US008824046B2

(12) United States Patent
Stewart

(10) Patent No.: US 8,824,046 B2
(45) Date of Patent: Sep. 2, 2014

(54) PROJECTION SCREEN WITH DIGITALLY PRINTED OVERSCAN BORDER

(75) Inventor: Grant W. Stewart, Cincinnati, OH (US)

(73) Assignee: Stewart Filmscreen Corporation, Torrance, CA (US)

(*) Notice: Subject to any disclaimer, the term of this patent is extended or adjusted under 35 U.S.C. 154(b) by 1350 days.

(21) Appl. No.: 11/624,472

(22) Filed: Jan. 18, 2007

(65) Prior Publication Data

US 2008/0174865 A1 Jul. 24, 2008

(51) Int. Cl.
*G03B 21/56* (2006.01)
*G03B 21/60* (2014.01)

(52) U.S. Cl.
CPC ...................................... *G03B 21/60* (2013.01)
USPC ......................................... 359/443; 359/450

(58) Field of Classification Search
USPC .................................................. 359/443, 450
See application file for complete search history.

(56) References Cited

U.S. PATENT DOCUMENTS

| | | | |
|---|---|---|---|
| 2,180,113 A | 11/1939 | Land | |
| 2,378,252 A * | 6/1945 | Staehle et al. | 359/453 |
| 3,251,264 A * | 5/1966 | Jacobson | 359/461 |
| 3,779,630 A | 12/1973 | Clausen et al. | |
| 3,791,725 A * | 2/1974 | Young | 352/129 |
| 3,846,001 A | 11/1974 | Kaplan et al. | |
| 3,966,301 A * | 6/1976 | Brown | 359/455 |
| 4,207,357 A | 6/1980 | Goossens | |
| 4,219,253 A | 8/1980 | Campion et al. | |
| 4,490,010 A * | 12/1984 | Honda et al. | 359/456 |
| 4,491,508 A | 1/1985 | Olson et al. | |
| 4,617,057 A | 10/1986 | Plueddemann | |
| 4,889,901 A | 12/1989 | Shama et al. | |
| 5,037,878 A | 8/1991 | Cerles et al. | |
| 5,352,747 A | 10/1994 | Ohtsuka et al. | |
| 5,579,164 A * | 11/1996 | Chapnik | 359/618 |
| 5,581,401 A * | 12/1996 | Takamoto et al. | 359/443 |
| 5,712,486 A | 1/1998 | Soltani et al. | |
| 5,837,346 A | 11/1998 | Langille et al. | |
| 6,093,471 A | 7/2000 | Hopfe et al. | |
| 6,128,130 A * | 10/2000 | Zobel et al. | 359/443 |
| 6,346,311 B1 | 2/2002 | Yeo et al. | |
| 6,411,436 B1 | 6/2002 | Kikuchi | |
| 6,614,594 B2 * | 9/2003 | Murasugi et al. | 359/450 |
| 6,724,529 B2 | 4/2004 | Sinkoff | |
| 6,773,787 B2 | 8/2004 | Maas et al. | |
| 6,803,158 B1 * | 10/2004 | Gordon et al. | 430/5 |
| 6,825,255 B2 | 11/2004 | Yuan et al. | |
| 6,839,167 B2 | 1/2005 | Elkelt et al. | |
| 7,038,849 B1 | 5/2006 | Samuels et al. | |
| 7,044,626 B2 * | 5/2006 | Randak | 362/604 |
| 7,130,118 B2 * | 10/2006 | Smythe et al. | 359/443 |
| 7,211,130 B1 * | 5/2007 | Chevli | 106/31.27 |

(Continued)

FOREIGN PATENT DOCUMENTS

JP  5-273647  * 10/1993  ............. G03B 21/58

*Primary Examiner* — Christ Mahoney
(74) *Attorney, Agent, or Firm* — Hasse & Nesbitt LLC; Donald E. Hasse

(57) ABSTRACT

A projection screen structure and method of making same is described wherein a projection screen material is formed to the desired size and shape and defining a central viewing area of selected shape and aspect ratio surrounded by a digitally printed border. The digitally printed border typically has a matte or flat black appearance for enhanced light absorbency and reduced reflectivity, and reduces or substantially eliminates the appearance of overscan in an image displayed on the screen.

6 Claims, 1 Drawing Sheet

(56) References Cited

U.S. PATENT DOCUMENTS 7,554,730 B1 * 6/2009 Kuo et al. .................... 359/443
2005/0162740 A1 7/2005 Hou
2008/0151369 A1 * 6/2008 Welch .......................... 359/463

* cited by examiner

PROJECTION SCREEN WITH DIGITALLY PRINTED OVERSCAN BORDER

FIELD OF THE INVENTION

The present invention relate generally to projection screens for use in displaying imagery from a TV, motion picture projection, or video projection, or a computer generated images display, or the like, and more particularly to projection screens having a digitally printed border for reducing the appearance of overscan.

BACKGROUND OF THE INVENTION

Projection screens of various kinds find substantial use for imagery projection in a large variety of situations for slide or motion picture projection, television or computer generated display, or other imagery projection source. The size of the image displayed on the projection screen can vary in size or aspect ratio depending on the source of the projection, mode or magnification of the images, spacing between the projection source and the screen surface, and other factors. Because the projection screen is not always sized to accommodate precisely the size of all images desired to be projected, systems or methods are often required to mask or otherwise control the display format for the images in a desirable or otherwise presentable fashion.

In addition to the consideration of image format control in defining a desired projection area on the screen, a problem known as "overscan" is encountered in setting up a projection screen. Overscan is the projection of the image outside a prescribed viewing area of the screen, and results in poorly defined edges of the image, and reduces the overall quality of the image presentation. To reduce the appearance of overscan, a flat black border is typically applied around the viewing area of the projection screen, in manner similarly to that used for applying masking. Such a border can be created with flat black paint. Alternatively, strips of black fabric or batting can be cut and applied with glue or mechanical fasteners (nails, screws, rivets, or the like). These methods are labor intensive and time consuming, and can add significantly to the cost of the projection screen.

SUMMARY OF THE INVENTION

The present invention solves or substantially reduces in critical importance problems with prior art projection screen structures by providing an improved projection screen and method of making same wherein a projection screen material of selected size is digitally printed to define a central viewing area of a desired shape and aspect ratio surrounded by a digitally printed border. The digitally printed border may comprise any suitable color and typically has a matte or flat appearance for enhanced light absorbency and reduced reflectivity, and reduces or substantially eliminates the appearance of overscan in the image displayed in the viewing area.

Accordingly, in one principal aspect of the invention, a projection screen is provided that includes a central viewing area of selected size and aspect ratio surrounded by a printed border that substantially eliminates the appearance of overscan in the projected image.

In another aspect of the invention, digital printing is incorporated into projection screen manufacture.

In another aspect of the invention, the border is digitally printed and typically has a matte or flat appearance for enhanced light absorbance and reduced reflectivity in an image displayed on the screen.

In yet another aspect of the invention, the border comprises a selected color having a desired aesthetic effect.

In another aspect of the invention, the central area is visibly free of printed matter from typical viewing distances, and can be structured to perform efficiently in conjunction with substantially any selected operating mode of the projection source within a wide range of aspect ratios, without the need for bulky masking systems.

In another aspect of the invention, the projection screen of the invention is configured as a front projection screen.

In another aspect of the invention, the projection screen of the invention is configured as a rear projection screen.

In yet another principal aspect of the invention, a method of manufacturing a projection screen is described in which a projection screen material is formed to a selected shape, and printed in a wide format digital printer with a matte or flat printed border in black or other appropriate color for substantially eliminating overscan in the projected image.

In yet another aspect of the method of the invention the wide format digital printer is provided with a file describing a digitally printed border surrounding a central viewing area of selected size, shape and aspect ratio, and uses the description file to print the border on the screen material.

In accordance with another advantage of the invention, a projection screen manufacturing method is provided that is less labor intensive than prior art methods.

A significant advantage of the invention resides in the improved process control for manufacturing the screen that results in a crisper, cleaner edge to the viewing area, the shape of the viewing area is better controlled, and the digitally printed portion on the screen is substantially non-reflective with high contrast ratio, and the screen exhibits high resolution and is highly durable.

In accordance with another significant advantage of the invention, an improved projection screen is provided at substantially reduced cost compared to previously commercially available screens.

Other aspects, advantages and objects of the invention will become apparent as a detailed description of representative embodiments proceeds.

BRIEF DESCRIPTION OF THE DRAWINGS

The invention will be more clearly understood from the following detailed description of representative embodiments thereof read in conjunction with the accompanying drawing figures.

DETAILED DESCRIPTION OF THE INVENTION

Figure 1:
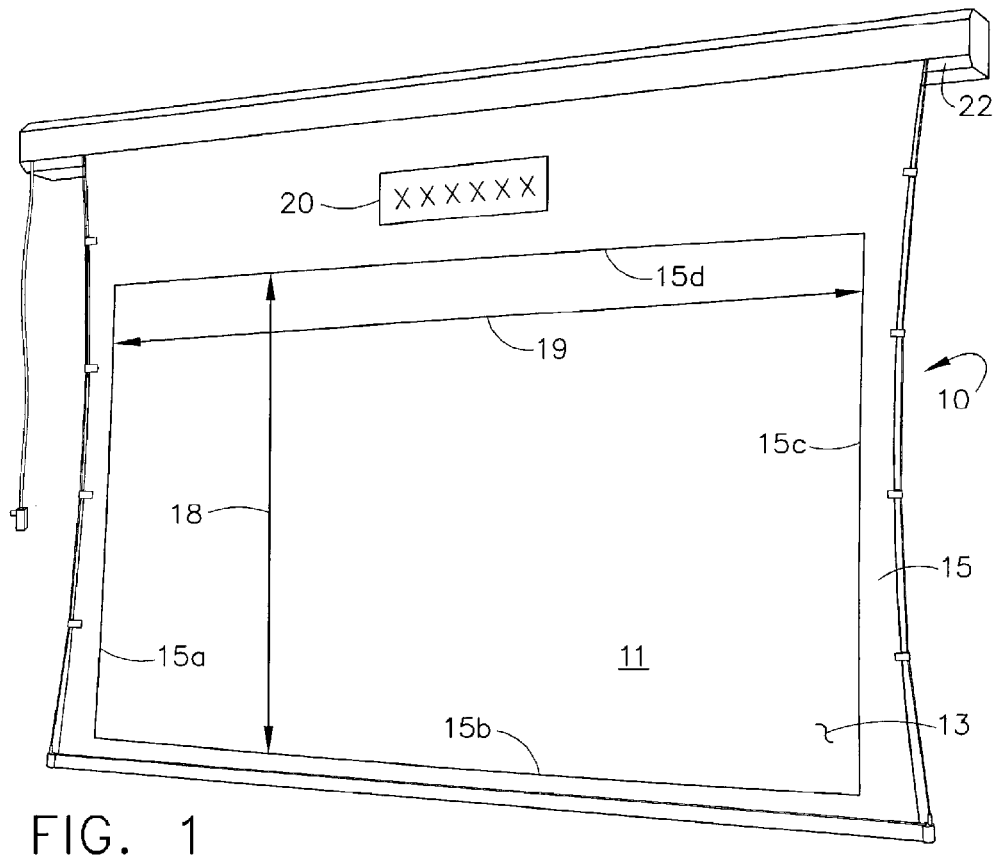
FIG. 1 is an illustration of a substantially rectangularly shaped projection screen of the invention having a digitally printed border.
Figure 2:
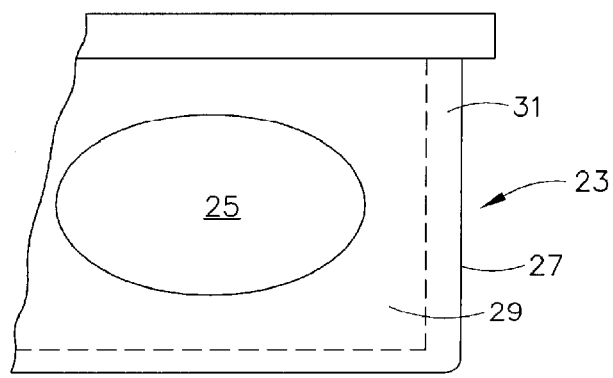
FIG. 2 shows an alternative embodiment of the invention illustrating an alternative shape for the viewing area.

Referring now to the accompanying drawing figures, FIG. 1 shows a plan view of a representative embodiment of a substantially rectangularly shaped front projection screen structured in accordance with the teachings of the present invention. FIG. 2 shows an alternative embodiment of the invention illustrating a representative alternative shape for the viewing area, such as the round or oval shape shown. It is noted from the outset that the teachings herein presented are equally applicable to screens used in rear projection as well as in front projection applications, the front projection screen illustrated in the figures being exemplary of both front and rear projection structures.

In FIG. 1, projection screen 10 comprises a sheet of projection screen material 11 of selected height and width consistent with the intended image projection application. The projection screen material 11 may comprise any suitable, commercially available screen material known in the applicable art and selected by one skilled in the art in accordance with these teachings, such as plastics, polymers (such as polyethylene, polyvinyl chloride or polyvinyl butyral), acrylics, woven cloth or other material, including commercially available screen materials that might occur to the skilled artisan practicing the invention, such as Stewart Filmscreen Corporation FIREHAWK, GRAYHAWK, ULTRAMATTE 150, VIDIOMATTE 200, and STUDIOTEK 130 projection screen fabrics, or their equivalents. Standard commercially available screen materials are available in sizes of up to about 40 feet by 90 feet. Accordingly, the size of projector screen 10 within the teachings presented here is not considered limiting of the invention. Screen material 11 can optionally have a surface treatment thereon in the form of a pearlescent spray treatment or the like for attaining a selected amount of optical gain for the projection surface, or for generally improving the optical gain of the projection surface. Typical white matte finish surfaces exhibit a gain of about 1.0. Gains of about 1.0 to 2.0 are typical for the materials and surface finishes contemplated herein. Such a surface treatment may be particularly desirable for front projection screens made in accordance with these teachings.

Projection screen 10 includes a generally centrally located viewing area 13 of preselected area and aspect ratio (ratio of height to width of the viewing area) surrounded by and defined within a printed border 15. The central viewing area 13 is that portion of the screen 10 onto which the output images from a projector are intended to be displayed. Viewing area color may be selected consistent with any intended aesthetic effects or desired gain level of the viewing area surface. The central viewing area should be visibly free from any printed matter, indicia or imagery, for typical viewing distances, that would diminish the quality of the projected image. In one embodiment, there is no printed matter in the viewing area 13. In another embodiment, small (e.g. about pixel size) dots or indicia may be regularly or irregularly distributed within the viewing area 13. However such dots should be imperceptible from the intended minimum viewing distance for the projection screen, (e.g., a distance equal to the 1.5 times the width of the viewing area, or alternatively a distance equal to the diagonal dimension of the viewing area). Typical aspect ratios desired for most image projection applications and contemplated as being within the teachings of the invention and within the scope of the appended claims, range from about 1:1 to about 1:2.66, the specific selected aspect ratio not considered limiting of the invention or of the appended claims. For most applications contemplated herein, screen 10 will have a viewing area 13 typically up to about 12 feet in height (dimension 18) and up to about 16 feet in width (dimension 19), screen dimensions also not considered limiting of the invention.

Border 15 that surrounds and defines the central viewing area 13, include top, bottom and side border portions 15a, 15b, 15c, and 15d. The widths of each border portion (distance between the inner and outer edges of the border) can be the same for all portions, or different, as needed for a particular installation or prescribed aspect ratio for viewing area 13, or to attain a desired aesthetic effect. Typically, the border portions 15 will have widths of at least three to six inches, which normally provides sufficient width to subsume overscan in most image display situations. The border 15 is digitally printed onto screen 10 with a wide format digital printer (such as NUR Ultima HiQ 3200 from NUR America, Inc., Moonachie N.J.), in ink having a flat or matte textured surface finish, in any suitable color, flat or matte black being useful in most applications contemplated herein as exhibiting a high degree of light absorbance and reduced reflectivity. Suitable inks usable in the invention include any of the inks available commercially for digital printing applications, specific ink selection not considered limiting of the invention. Any of the ultraviolet cured inks commercially available may be especially useful in the practice of the invention. Digital printing in widths up to about 40 feet are commercially available, although applications typically contemplated hereunder normally utilize printing capacity of up to about sixteen feet. Use of digital printing in association with the practice of the invention results in a crisper and cleaner defined edge of the border portions 15 defining the viewing area 13 than would be attainable by prior art methods such as silk screening. It must be noted that a highly desirable aspect of the invention resides in the ability to include in the digital print file (see below) for the border portions 15 a corporate logo such as indicated at 20 or other indicia in any of the vertical or horizontal portions 15a, 15b, 15c or 15d.

Screen 10 of the invention may comprise a substantially permanently mounted structure or may be retractable using conventional retraction means illustrated as at 22 in FIG. 1.

Referring now to FIG. 2, shown therein in partial cutaway is a screen 23 having a viewing area 25 of shape alternative to the rectangular shape shown in FIG. 1, to illustrate the breadth of the invention as contemplating screens having viewing areas of substantially any shape. In FIG. 2, viewing area 25 is illustrated as being substantially oval in shape, although the alternative shape can be, for example, circular or other shape as would be selected by the skilled artisan practicing the invention corresponding to the shape and format of the projected image. In addition to the color selected for application to screen material 27 as border 29 that defines the shape of viewing area 25, second border portions 31 surrounding all or part of border 29 may be applied separately in color or design different from border 29 that aesthetically coordinate with the background color or decor of the wall or room in which screen 29 is mounted or suspended.

In accordance with another aspect of the invention, and with reference again to FIG. 1, an improved projection screen may be fabricated by selecting a material 11 for screen 10, and forming the material to a desired length and width. Data defining a border area 15 surrounding and defining a viewing area 13 for the screen is stored as computer readable instructions and data in a description file. The border 15 is digitally printed using wide format digital printer using a description file such as a POSTSCRIPT file. In the printing process, the central viewing area 13 should be left visibly free of printed matter. The screen can then be trimmed to a finished size and fitted within suitable framing and/or mounting devices.

The present invention therefore provides an improved projection screen, and method for making same, for use in displaying imagery from a TV, motion picture projection, video projection, computer generated images display, or the like, wherein the screen includes a digitally printed border for reducing the appearance of overscan in the projected image. It is understood that modifications to the invention may be made as might occur to one with skill in the field of the invention within the scope of the appended claims. All embodiments contemplated hereunder that achieve the objects and advantages of the invention have therefore not been shown in complete detail. Other embodiments may be developed without departing from the spirit of the invention or from the scope of the appended claims.

What is claimed is:

1. A method of manufacturing a projection screen, comprising the steps of:
    (a) providing a sheet of material having a surface for displaying an image projected thereon; and
    (b) digitally printing a substantially non-reflective ink border on said surface of said material, said border surrounding and defining therewithin a viewing area of preselected size and shape on said surface of said material.

2. The method of claim 1 wherein said material is selected from the group consisting of plastics, polymers, acrylics, and woven cloth.

3. The method of claim 1 wherein said printed border comprises black ink.

4. The method of claim 1 wherein said viewing area has a shape selected from the group consisting of rectangular, oval and circular.

5. The method of claim 1 wherein said viewing area has an aspect ratio in the range of from about 1:1 to about 1:2.66.

6. The method of claim 5 wherein said border is disposed on said material to define a viewing area on one of a front projection screen and a rear projection screen.

* * * * *